United States Patent [19]

Mecca

[11] 3,988,878
[45] Nov. 2, 1976

[54] CONVEYOR MEANS FOR HARVESTING MACHINES

[75] Inventor: Vito M. Mecca, North Collins, N.Y.

[73] Assignee: Mecca Bros. Inc., North Collins, N.Y.

[22] Filed: May 8, 1975

[21] Appl. No.: 575,519

[52] U.S. Cl. .................................. 56/330; 198/706
[51] Int. Cl.² .................. A01D 46/00; B65G 17/16
[58] Field of Search ........... 198/145, 148, 150, 155, 198/158; 214/83.34, 83.36; 56/330

[56] References Cited
UNITED STATES PATENTS

| | | | |
|---|---|---|---|
| 1,142,453 | 6/1915 | Olson | 198/145 |
| 3,083,814 | 4/1963 | Meyer | 198/145 |
| 3,756,002 | 9/1973 | Mecca | 198/145 |

*Primary Examiner*—Evon C. Blunk
*Assistant Examiner*—Joseph E. Valenza
*Attorney, Agent, or Firm*—Christel & Bean

[57] ABSTRACT

A conveyor system for harvesting machines comprising a plurality of pivotally supported buckets of relatively rigid and nonporous material such as metal or plastic adapted to be moved through an endless path. The path includes spaced horizontal and vertical portions each defined by spaced and parallel rails fixed to the machine frame. Each bucket is supported in a crop-carrying position by an element at each end thereof having a rod portion rotatably connected to the bucket and having a bearing roller mounted thereon for engaging the rails. The supporting elements include a leg portion engaging the bucket at a location spaced from the pivotal connection of the rod portion for limiting pivotal movement of the bucket along a portion of the conveyor path. Each bucket is pivoted to a position for discharging crops along other portions of the path by means on the bucket which engages a rail in a manner pivoting the bucket about the supporting rod portion.

15 Claims, 10 Drawing Figures

CONVEYOR MEANS FOR HARVESTING MACHINES

BACKGROUND OF THE INVENTION

This invention relates to conveyor systems and more particularly to a conveyor system for use in harvesting machines and similar applications.

One area of use of the present invention is in machines for harvesting crops from bushes or vines planted in rows. In such machines it is often desired to convey the harvested crops, for example grapes, from one area of the machine, often near the bottom, to another area such as the top of the machine, where the crops are collected. Some important requirements on the design of a conveyor for harvesting machinery are that it remain clean during reasonably long periods of operation, allow little or no crop loss or spillage during conveyance to the machine collecting area, be of simple construction, and provide maximum conveyor working length for a given machine size.

The foregoing requirements are met by a conveyor system including a plurality of pivotally supported buckets of relatively rigid and nonporous material, such as metal or plastic. In such a conveyor system it would be highly desirable to provide a mounting or supporting arrangement for the buckets enabling them to be removed and replaced quickly and easily and yet not interfering with crop collection or gathering by the buckets. In addition, it would be highly desirable to provide such a mounting arrangement which prevents crops spillage both when crops are initially received by the buckets and during conveyance.

Another important requirement on the design of a conveyor for harvesting machinery is that it be operative with crops which grow relatively close to the ground.

SUMMARY OF THE INVENTION

The present invention provides a novel conveyor system for harvesting machines including a plurality of pivotally supported buckets of rigid nonporous material adapted to be moved through a path including spaced horizontal and vertical portions. The buckets are supported by means at each end thereof in a crop carrying position, and the supporting means include means limiting pivotal movement of the buckets along a portion of the conveyor path. The buckets are pivoted to a position for discharging crops along another portion of the path.

By way of illustrating the present invention will be described with particular reference to harvesting machinery of the type wherein crops growing on bushes or vines planted in rows are agitated, although the principles of the invention may be variously applied. While a single specific embodiment of the principles of the present invention is illustrated in the accompanying drawing and described in detail in the following specification, it is to be understood that such embodiment is by way of example only and that various mechanical modifications may be made without departing from the spirit and scope of the invention.

DETAILED DESCRIPTION OF THE ILLUSTRATED EMBODIMENT

A harvesting machine of the present invention includes an ambulatory supporting frame 10 which is adapted for longitudinal movement along a row of plants. The frame includes, briefly, vertical end members 11–14 and upper horizontal side members 15 and 16. Each side of the frame also includes an intermediate member, one shown at 20 in FIG. 2, which in the present instance is disposed generally diagonally. The frame members thus are arranged so as to enable the machine to straddle a row of plants or vines as it is moved longitudinally along the row. A pair of wheels 22, 23 are rotatably connected to the frame by means of corresponding axles 24 and 25.

Figure 2:
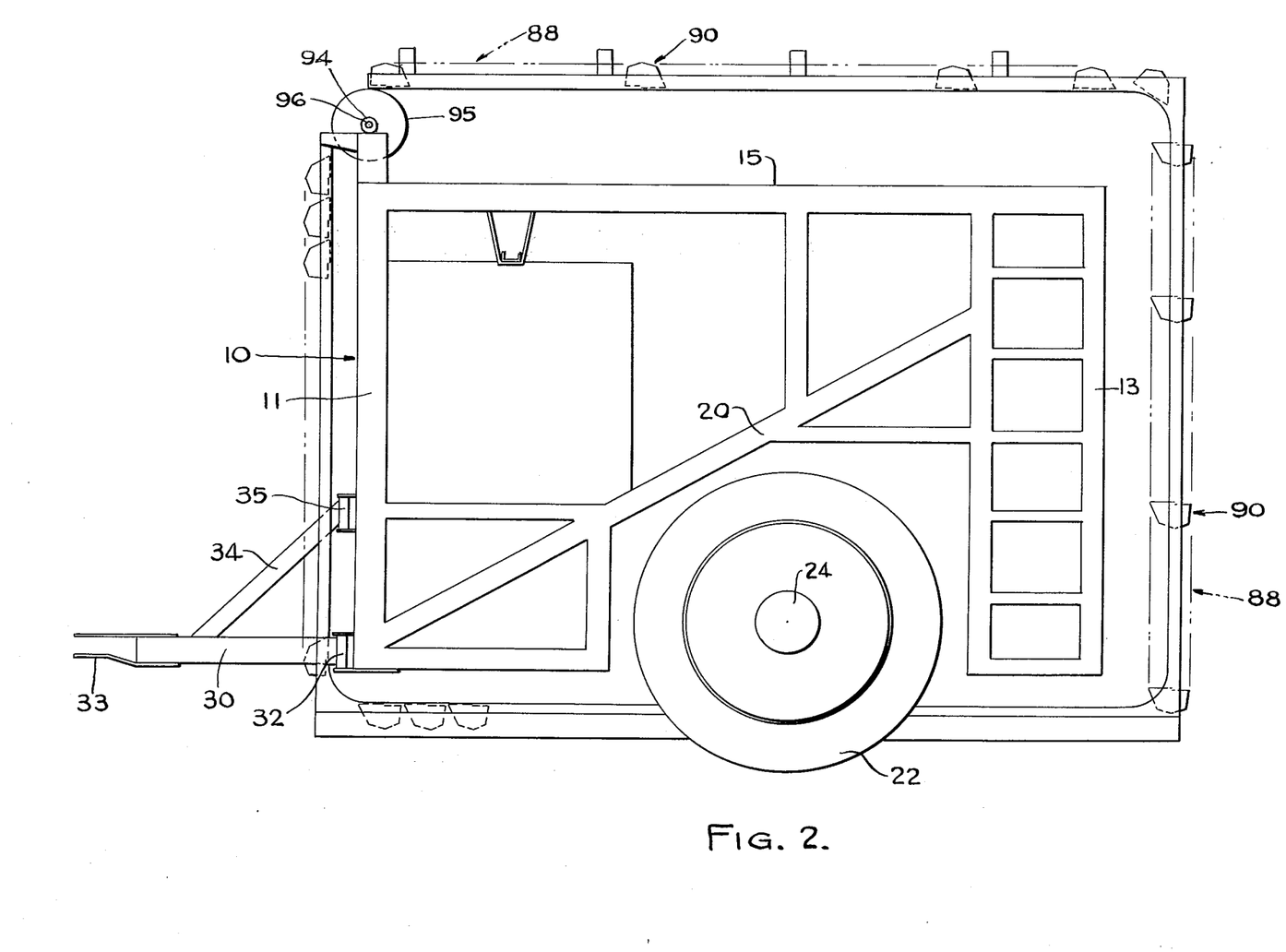
FIG. 2 is a fragmentary side elevational view of the harvesting machine of FIG. 1.

The machine of the present invention is of the type adapted to be moved along a row of plants by a separate vehicle, for example a tractor. A suitable arrangement thus is provided for connecting the frame 10 to the vehicle which will draw it. As shown in FIG. 2, a generally horizontal bar 30 is connected by means of a suitable bracket 31 to one of the frame members and near the lower portion of frame 10. A conventional hitch 33 is included on bar 30 for connection to the vehicle, and preferably a supporting arm 34 is connected at one end to bar 30 and at the other end through a bracket 35 to frame 10.

The harvesting machine further comprises crop removing means in the form of shaker means, generally designated 40, carried by the machine frame and including a plurality of foliage agitating members or beater elements which extend from opposite sides of the machine toward opposite sides of the row of plants when the machine is moved along the row. In the present illustration, the foliage agitating members or beater elements comprise fingers or rods 42 and 43 extending inwardly from opposite sides of the machine. The fingers 42 at the right-hand side of the machine as viewed in FIGS. 1–3 comprise two vertical series, with each rod coupled through a corresponding bracket 45 to a vertical post 46 pivotally connected at the upper and lower ends thereof to the machine frame. Similarly, the fingers 43 at the opposite side of the machine comprise two vertical series and likewise are coupled through corresponding brackets 47 to vertical posts (not shown) which are pivotally connected at the upper and lower ends thereof to the machine frame.

Figure 3:
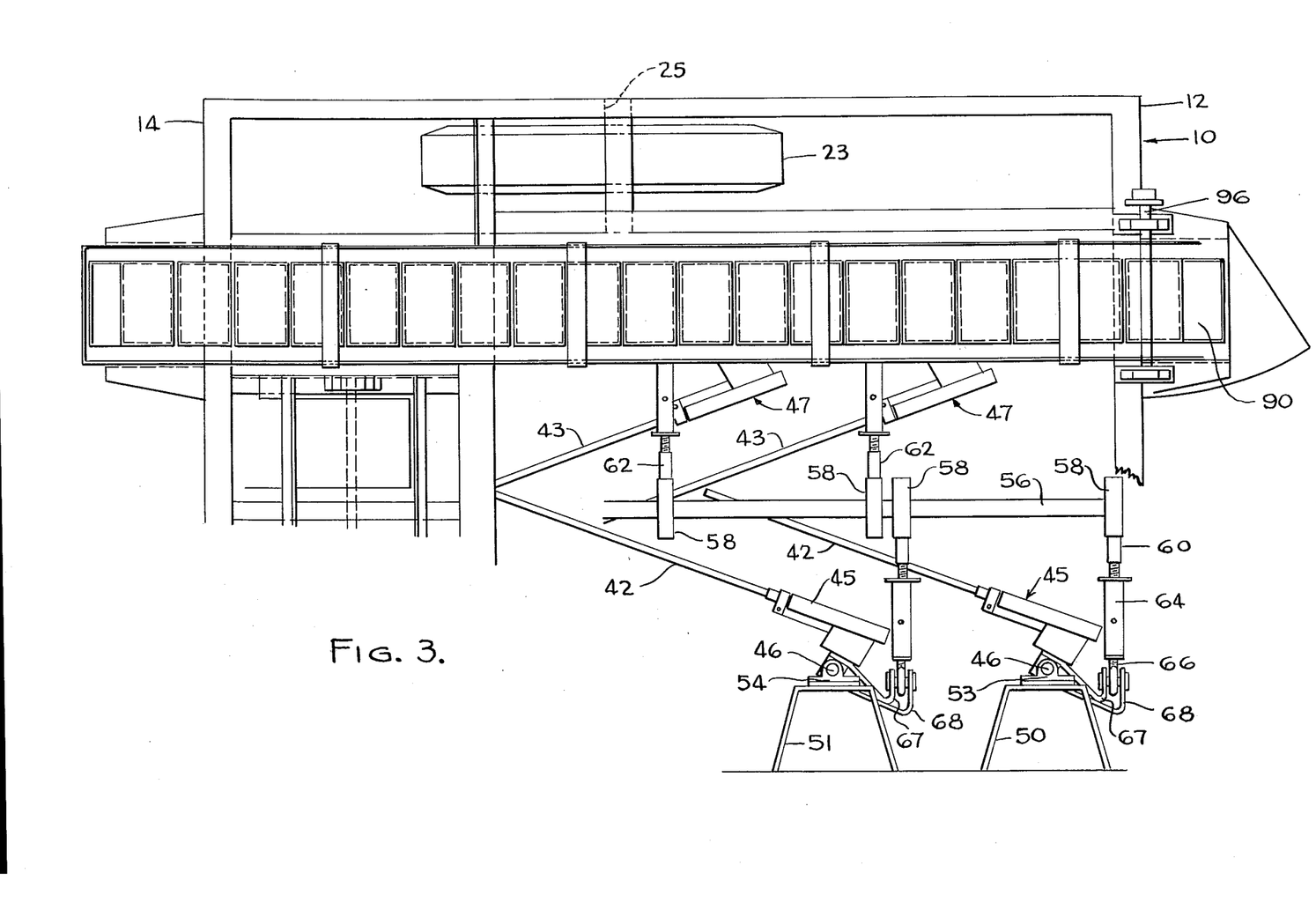
FIG. 3 is a fragmentary plan view of the harvesting machine of FIG. 1.

In the present illustration on the beater elements 42 at one side of the machine are staggered with respect to the beater elements 43 at the opposite side of the machine so that, in effect, the foliage is pushed first in one direction and then the other as the machine moves along a row. In addition, the beater elements are mounted and driven in a manner such that as the beater elements on one side of the machine, for example fingers 42, move toward the center of the row of plants the beater elements on the opposite side, i.e. fingers 43, move away from the center of the row of plants, and vice versa, during machine travel for further agitating the foliage. The elongated beater elements 42, 43 preferably are disposed so that the longitudinal axes thereof extend rearwardly relative to the forward direction of travel of the machine, as shown in FIG. 3.

The means for mounting and moving the beaters at each side of the machine includes, briefly, a pair of upper and lower bracket members for each vertical series of beater elements, the bracket members being fixed to the machine frame and extending inwardly toward the center of the machine. FIG. 3 shows the upper bracket members 50, 51 on one side of the machine for the two vertical series of beater elements, there being two corresponding lower bracket members (not shown) on that side of the machine and, similarly, upper and lower bracket members (not shown) on the other side of the machine. There is fixed to each bracket a bearing, for example bearings 53 and 54 fixed to brackets 50 and 51, respectively, and the vertical posts 46 are journalled or otherwise pivotally mounted at the upper and lower ends thereof in these bearings.

A crankshaft 56 is journalled in the machine framework at spaced locations there along and has axially spaced throws 58 connected thereon which reciprocate connecting rods 60 and 62 on opposite sides of the machine, respectively. Connecting rods 60, 62 each thread into one end of an adjusting link 64, the other end of which is connected to a threaded eye bolt 66. Each bolt, in turn, is coupled through a linkage comprising a pair of arms 67, 68 to the upper end of the vertical posts 46. The foregoing arrangement is provided on both sides of the machine. As a result, reciprocation of rods 60, 62 pivots or oscillates beaters 42, 43 about the vertical axes of posts 46. The initial angular disposition of beaters 42, 43 may be adjusted by rotating links 64 in a manner similar to a turn-buckle.

Crankshaft 56 is rotated by means of a hydraulic motor or similar drive means (not shown), and as a result the vertical posts on both side of the machine are pivoted simultaneously in the same direction, i.e. in phase, to move the beater elements alternately toward and away from the longitudinal center line of the harvesting machine. A more detailed description of the foregoing illustrative shaker means can be obtained in my pending application Ser. No. 575,520 filed May 8, 1975 entitled "Foliage Agitating Means For Harvesting Machines" and assigned to the assignee of the present invention. It should be understood, however, that the conveyor system of the present invention can be included on harvesting machines which are provided with various other types of crop removing means, shaker means or foliage agitating means.

Figure 1:
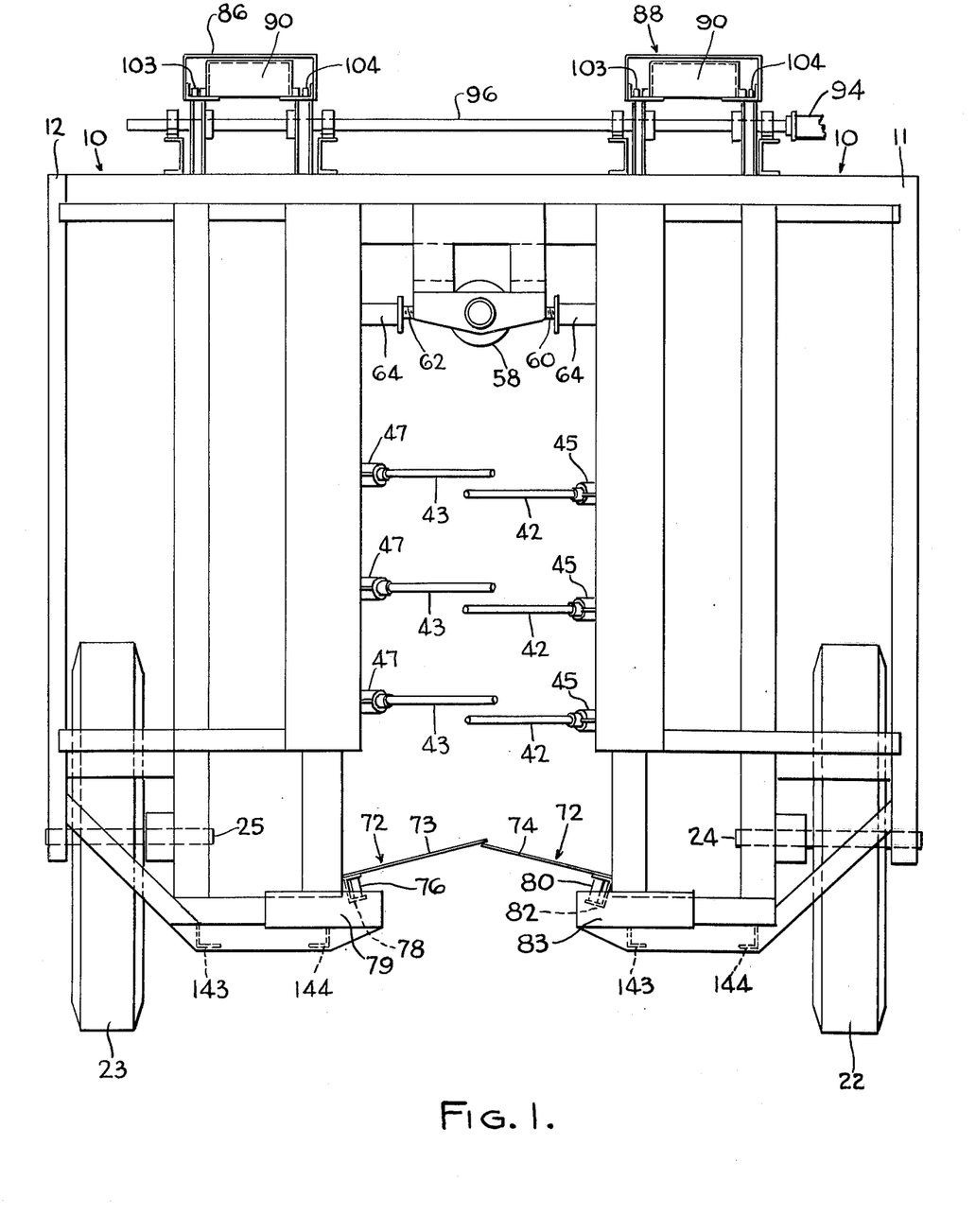
FIG. 1 is a fragmentary elevational view of one end of a harvesting machine provided with a conveyor system according to the present invention.

The harvesting machine of the present invention includes a system whereby the crops, for example grapes, upon being removed from the plants or vines by action of shaker means 40 first are directed to and collected generally in the lower region of the frame 10, then are conveyed to a zone or point preferably in the upper region of frame 10, and finally are collected by a suitable arrangement and transmitted or conveyed to storage receptacles. Such receptacles, of course, can be carried externally on the frame 10 or carried by a separate vehicle moving along side the frame 10. Referring now to FIG. 1, a floor 72 comprises a plurality of first overlapping shutters 73 arranged along one side of the machine and a plurality of second overlapping shutters 74 arranged along the opposite side of the machine. The bank or series of shutters 73 are inclined downwardly and outwardly from the center to the one side of the machine, and the bank or series of shutters 74 are inclined downwardly and outwardly from the center to the opposite side of the machine. Since such flooring arrangements are well-known in the art, a brief description is deemed to be sufficient. Each shutter, for example shutter 73, is pivotally mounted on a pin 76 which is connected in a channel member 78 which, in turn, is mounted on an inwardly directed portion 79 of a lower member of the machine frame. Shutter 74 shown in FIG. 1 is connected by a similar arrangement including pin 80, channel member 82 and frame portion 83. Each shutter is held in a normally closed position by a coil spring (not shown) connected thereto and to the channel member. As a result, the shutters progressively and yieldingly open and close about the plant stems or vines as the machine travels along a row of plants. As shown in FIG. 1, the shutters extend outwardly and downwardly from the center of the machine to assure that crops which fall onto flooring 72 are directed toward the conveyor system which now will be described.

The conveyor system includes two spaced apart paths 86, 88 defined by an arrangement of rails or tracks each of which paths, in turn, includes spaced apart generally horizontal and vertical portions so as to be substantially rectangular. Each path includes a plurality of buckets, one being designated generally at 90, for carying harvested crops such as grapes, and the buckets of each path are moved by an endless chain, such as chains 103, 104 connected to the buckets and to a drive means. The latter comprises a conveyor drive motor 94 mounted on machine frame 10 which is drivenly coupled to chains 103, 104 by a shaft 96 and an arrangement of sprockets, one of which is designated 95 in FIG. 2.

The lower portionss of the conveyor paths are at a level whereby crops moving outwardly along flooring 72 are received by the conveyor buckets upon leaving the outermost edges of the flooring members. The buckets travel in a crop carrying position along the lower portion of the frame 10 to the end remote from shaker 40, as best seen in FIG. 2, whereupon they travel upwardly in a generally vertical direction for a distance substantially equal to the height of machine frame 10. In the upper right hand corner of frame 10 as viewed in FIG. 2, the buckets are pivoted so as to discharge or dump their contents into an arrangement for collecting the crops and transferring them from the machine. One preferred arrangement includes a conveyor belt (not shown) positioned in the machine frame to receive discharged crops adjacent one end and extending laterally outwardly from the harvesting machine to separately carried bins or receptacles or, alternatively, such receptacles can be carried by frame 10.

Figure 4:
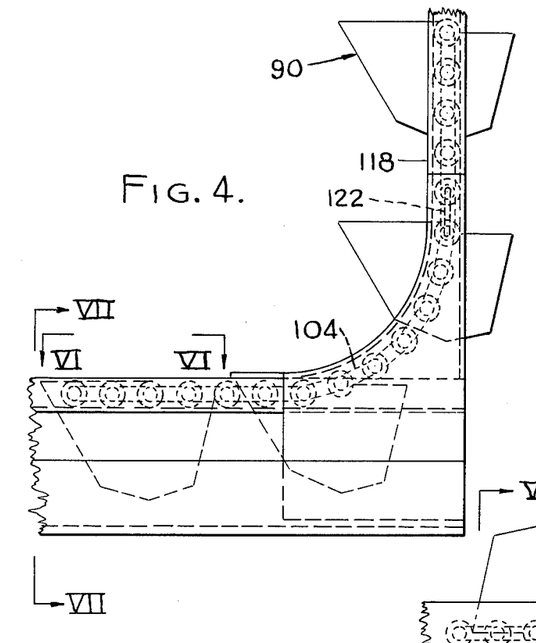
FIG. 4 is an enlarged fragmentary elevational view of the portion of the conveyor system shown in the lower right-hand portion of FIG. 2.
Figures 5, 7:
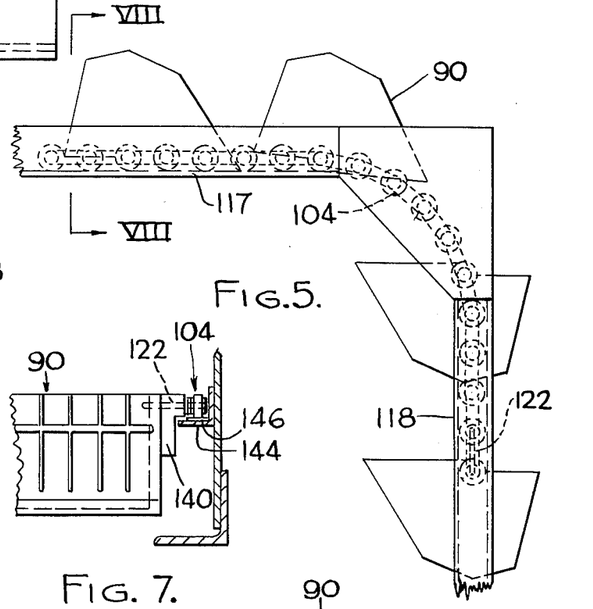
FIG. 5 is an enlarged fragmentary elevational view of the portion of the conveyor system shown in the upper right-hand portion of FIG. 2.
FIG. 7 is a fragmentary elevational view taken about on line 7—7 in FIG. 4.
Figure 8:
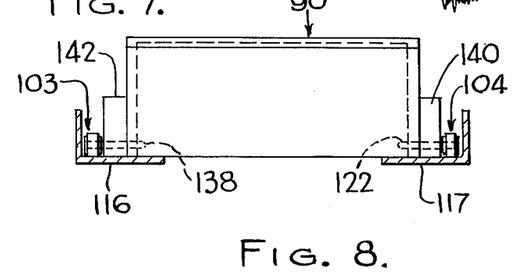
FIG. 8 is a fragmentary elevational view taken about on line 8—8 in FIG. 5.
Figure 9:
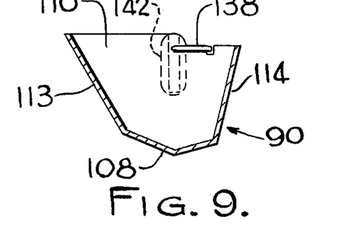
FIG. 9 is a sectional view taken about on line 9—9 in FIG. 6.

FIGS. 4–10 illustrate in further detail the conveyor system of the present invention. The system includes a plurality of buckets 90 extending around the entire length of each of the paths 86 and 88, and each bucket include a bottom 108 and first and second vertically disposed end walls 110 and 111. The bucket is completed by first and second side walls 113, 114 which in this particular illustration extend outwardly at different angles relative to the bottom of the bucket. Side-wall 113, which can be designated forward in terms of the direction of travel of the machine, extends outwardly at a greater angle. The buckets also advantageously are made of relatively rigid nonporous material such as a suitable plastic, for example polypropylene. The conveyor system paths 86 and 88 each include upper and lower horizontal portions and first and second vertical portions. For example, FIGS. 4 and 5 show junctions of one of the vertical portions with each of the lower and upper horizontal portions, respectively. The path defining means for each path comprise pairs of spaced parallel and substantially coplanar rails, such as rails 116, 117 of the upper horizontal portion of each path as shown in FIG. 8 and the pair of rails of both vertical portions of each path, for example vertical rail 118 shown in FIGS. 4 and 5. FIG. 7 shows one rail 144 of the pair of rails included in the lower portion of each of the conveyor paths 86 and 88. The rails are fixed to the machine frame, and the horizontal rails are generally parallel to the direction of travel of the machine.

Figure 10:
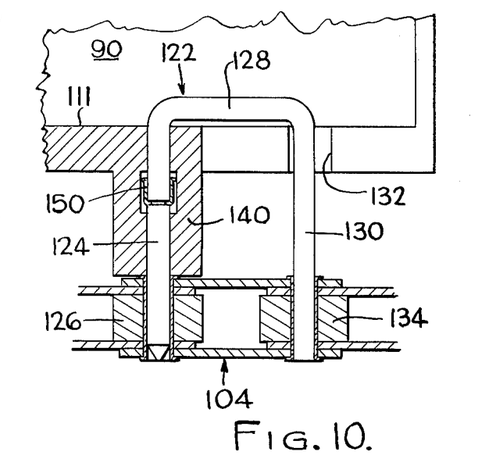
FIG. 10 is a fragmentary plan view, partly in section, of a bucket supporting element of the present invention.

The system further comprises supporting means operatively associated with each of the buckets and engaging the path defining means for movement along the conveyor path, the supporting means allowing pivotal movement of each bucket. A first bucket supporting element 122 has a leg portion 124 which extends through an opening or aperture provided through bucket wall 111 so as to be pivotably or rotatably received therin. Leg 124 serves as a rod or shaft portion of element 122 and the bucket supporting means. Leg 124 extends from bucket 90 and is operatively connected to a bearing means in the form of roller 126 of chain 104 which roller bearing engages the conveyor path defining rails or tracks so as to be movably supported thereby in a manner which will be described. The bucket supporting means further comprising means for engaging the bucket at a location spaced from the pivotal connection of the rod or shaft component to the bucket for limiting pivotal movement along the portion of the conveyor path adjacen the crop removing means. The means for limiting pivotal movement comprises a central or first leg portion 128 extending from rod portion 124 along bucket 90, i.e. along the inner surface of bucket wall 111 as illustrated in FIG. 10 and a second leg portion 10 engaging the bucket at a location spaced from the pivotal connection of red 124 to bucket wall 111. Leg 130 engages the edge of the bucket wall, being received in a recess 132 provided therein, and extends out from bucket 90 and is connected at the outer end thereof to another roller 134 of chain 104. The connection of leg 130 to roller 134 holds leg 130 in a fixed position relative to the bucket along the portion of the conveyor path adjacent the crop removing means.

Leg 128 is disposed at about a right angle to rod 124 and leg 130 is disposed generally parallel to rod 124 and generally perpendicular to leg 128. Rod 124 and leg 130 are substantially equal in length, and rollers 126 and 134 are adjacent rollers in the chain in the present illustration. The bucket supporting means for each bucket includes a second bucket supporting element 138 identical to element 122 and operatively associated with the opposite bucket end wall 110. Element 138 has a rod portion rotatably connected in wall 110 and a leg portion engaging wall 110 with both rod and leg portions being connected to adjacent rollers of chain 103 in a manner similar to that of element 122 and chain 104 as previously described. The chains 103, 104 and supporting rollers thereof are spaced apart the correct distance so as to contact and move along the spaced apart rails which comprise the conveyor path defining means for each of the conveyor paths 86 and 88.

The conveyor system is provided with an enless chain connected to each of the buckets, and preferably the two chains 103, 104 are included in each path 86 and 88 and operatively connected to buckets 90 adjacent end walls 110, 111 in the manner as previously described. The chains are connected through sprockets such as the one designated 95 to shaft 96 which is rotatably supported on the machine frame and driven by motor 94 mounted on the machine frame as shown in FIG. 2. The buckets 90 travel through a substantial portion of each path, 86, 88 in a position whereby they carry the harvested material, and are pivoted to a discharge position through another portion of each path. This is accomplished by means on each bucket 90 for engaging cooperating means on the machine frame which now will be described.

Referring now to FIGS. 7-10, each bucket 90 is provided with pivoting means in the form of an outwardly extending or protruding element 140 on the end wall, for example wall 111. Element is elongated and preferably is intergrally forward so as to be an extending portion of end wall 111, with bucket 90. Element 140 is disposed so that one end thereof receives rod portion 124 of supporting element 122, and the other end is located so that the longitudinal axis of element 140 is substantially perpendicular to the longitudinal axis of bucket 90. In other words, when bucket is supported in a normal carrying position, the longitudinal axis of element 140 is substantially vertical. Preferably an identical second element 142 is provided on bucket end wall 110.

Figure 6:
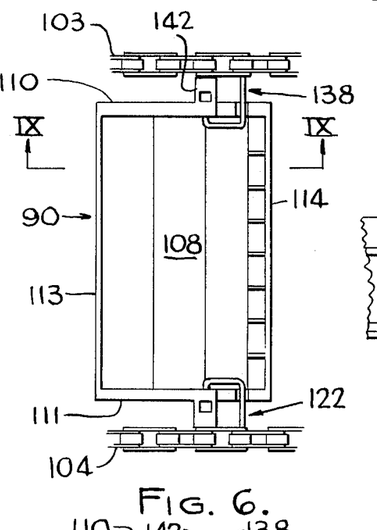
FIG. 6 is a fragmentary plan view taken about on line 6—6 in FIG. 4.

Rail 144 shown in FIG. 7 and its companion members (not shown) defining the lower horizontal portion of each path 86, 88 each are of generally L-shaped cross section. The rails are of a size and are positioned in the machine frame 10 so that the horizontal legs thereof are contacted or engaged by only the supporting bearing rollers, i.e. the rollers of chains 103, 104, of each bucket. As a result, buckets 90 are in a carrying position with the bottoms 108 thereof generally horizontal and with elements 140, 142 generally vertical as illustrated in FIGS. 4, 6 and 7. The buckets 90 remain in this carrying position along the entire lower horizontal portion of each path 86, 88 and also along the vertical portions of paths 86, 88 as illustrated in FIGS. 4 and 5. The vertical rails such as rail 118 are channel-shaped each including two legs extending inwardly at right angles from a web portion, and this configuration facilitates guiding of buckets 90 during their vertical travel. Each element 140, 142 remains generally vertical as it and the rollers travel in and along the channel-shaped vertical rails in a manner stabilizing or holding the buckets to prevent tipping. In addition, during upward vertical movement of buckets 90 and chains 103, 104, the bucket supporting elements 122, 138 are pivoted about the corresponding shaft portions through an angle of 90 degrees so that the central leg portions are disposed generally vertically as shown in FIGS. 4 and 5.

Rail members 116 and 117 defining the upper horizontal portion of each path 86, 88 also are of L-shaped cross section. These rails, however, are of a size and are positioned in the machine frame so that the horizontal legs thereof are contacted or engaged by the supporting rollers of chains 103, 104, by pivoting and by the edge of each bucket along the end walls 110, 111 thereof. As a result, buckets 90 are pivoted to an inverted discharging position with the bottom thereof generally horizontal and with elements 140, 142 generally horizontal as illustrated in FIG. 8. In particular, chains 103, 104 and pivoting elements 140, 142 are guided along the curved rail on track sections between the vertical portions and horizontal portions whereby pivoting of the buckets 90 is initiated. Then, the horizontal legs of rail members 116, 117 first are contacted by the chain roller connected to the second leg of the bucket supporting element, such as roller 134, and then are contacted by the pivoting elements 140, 142 and by the upper edges of the buckets end walls 110, 111. As a result, the buckets 90 are pivoted through an angle of 180 degrees about the connection of the supporting elements 122, 138 to the bucket end walls, for example about pivotal connection of rod portion 124 to bucket end wall 111 as shown in FIGS. 5 and 8. Buckets 90 remain in this discharging position as they travel toward the front of the machine along the entire upper horizontal portion of each path, whereupon they are again pivoted and travel down the other vertical portions of paths 86, 88 in preparation for another collection cycle as illustrated in FIG. 2. A replaceable wear strip of suitable material, for example metal or synthetic materials such as Teflon or Nylon, is designated 146 in FIG. 7, and the horizontal rail surfaces of the upper and lower rails can be provided with such replaceable wear strips to minimize bucket wear.

In operation, the harvesting machine is moved, for example by a tractor, through a field of bushes or vines planted in rows in a manner whereby the vines or bushes are straddled by the machine frame 10 and, hence, by shaker means 40. Vibratory or agitating motion is imparted by the beater elements 42, 43 to the bushes or vines contacted thereby as previously described causing the crops, for example grapes, to be removed therefrom whereupon they fall to the flooring 72. The inclined floor members direct the crops outwardly from the region of the center of the machine to conveyor buckets 90 traveling through the lower horizontal portions of the conveyor system paths 86, 88 at each side of the flooring 72. The leg portion, for example leg 130 of each supporting element engaging the upper edge of the bucket, prevents tipping of the buckets as they receive crops. As shown more clearly in FIG. 2, the crops then are conveyed, relative to the machine, rearwardly from shaker means 40 in a generally horizontal direction, whereupon they are conveyed vertically into proximity with the crop collector as previously described. At this point the conveyor buckets are pivoted to a discharge position by the arrangement previously described and the crops discharged therefrom are conveyed from the machine by the belt (not shown) to the aforementioned storage receptacles. The buckets continue to travel in a discharge position along the upper horizontal paths toward the front of the machine whereupon they return vertically to the lower horizontal portion of the paths in the vicinity of shaker means 40 where they are returned to a carrying position to receive additional crops.

Buckets 90 can be removed selectively and individually from the conveyor system whenever desired, such as for maintenance. The supporting elements at each end of a bucket, for example supporting elements 122 and 138 shown in FIG. 6, are easily removed by hand in the following manner. Referring now to FIG. 10, a retainer clip element 150 in the shape of a generally cylindical bushing is carried by the rod portion of each supporting element, such as rod portion 124, and clip 150 is positioned in a longitudinal bore or passage in the adjacent body region of the bucket, in the present illustration in the pivoting portion 140. One end of clip 150, which is of resilient material such as spring metal, snap fits in an annular groove provided in rod portion 124 and the other end of clip 150 about the inner wall of the passage. As a result, longitudinal movement of the supporting element is prevented under vibration and normal operation conditions of the harvesting machine. When the conveyor is stationary, each supporting element can be removed by inserting a screwdriver or similar tool between the central leg portion 128 of the supporting element and the adjacent inner surface of the bucket end wall and using a prying or lever action with moderate force to overcome clip 150 and pull the supporting element longitudinally from connection to the corresponding chain and bucket end wall. With both supporting elements removed, the bucket is free of the conveyor. The supporting elements are easily reinstalled to connect the bucket to the conveyor simply by holding clip 150 in position in the passage by means of longnosed pliers or magnetized screwdriver and then pushing the supporting element into position connected to the respective chain rollers and with the clip element 150 snap fitted back into place.

By virtue of the arrangement of supporting elements adjacent each end wall of the buckets, the buckets are pivotally supported effectively in the conveyor system in a manner which does not interfere with crop collection by the buckets. In particular, each supporting element has a rod portion, for example rod portion 124, for pivotally supporting the bucket and a leg portion, for example leg 130 for limiting pivotal movement of the bucket along the lower horizontal portion of the conveyor path adjacent shaker 40, and the foregoing arrangement does not include any elements extending across the open crop receiving area of the bucket. In other words, the supporting elements, being adjacent each end of the bucket, do not interfere with entry of crops into the bucket and also do not interfere with discharge of crops when the buckets are pivoted to a discharge position. Furthermore, the supporting elements are constructed to be easily removable without sacrificing any of the foregoing advantages. In other words, the buckets are mounted or supported in the conveyor system in a manner whereby they are easy to remove and reassemble and yet in a manner not hampering crop collection.

The simple arrangement whereby buckets 90 are pivoted through about an angle of 180 degrees from a carrying position to a discharging position together with the inclined side walls 113, 114 of the buckets insures total removal of the crops from the buckets. The pivoting arrangement of the present invention enables a rectangular path to be utilized which, in turn, maximizes the conveyor working length for a given size. The rectangular path also enables the machine and conveyor system to have a relatively low profile with respect to the ground thereby advantageously allowing a large variety of crops to be harvested and collected. The fact that the pivotably supported buckets 90 travel in horizontal and vertical paths while in a carrying position insures little or no crop spillage prior to discharge. Furthermore, the ability of the conveyor system to carry crops in buckets vertically enables the machine to be relatively shorter in overall length. In addition, the relatively simple conveyor arrangement of the present invention is mechanically easy to assemble and maintain.

While the conveyor system of the present invention has been described with particular reference to harvesting machines, it can be used effectively in other product or material handling and transporting situations. One example is in a canning plant for conveying crops such as beans, corn, beets and peas from a loading or receiving station at one location along the conveyor path to an unloading or discharge location at another location spaced along the conveyor path. The foregoing advantages of the conveyor system in harvesting machines, such as no interference with product collection by the buckets, easy removal and reassembly of the buckets, little or no product spillage from the buckets prior to discharge, and total removal of product when the buckets are pivoted to a discharge position, also are provided in such other uses of the conveyor system.

It is therefore apparent that the present invention accomplishes its intended objects. While a single embodiment of the present invention is described in detail, this is done for purposes of illustration, not limitation.

I claim:

1. In a harvesting machine including an ambulatory supporting frame adapted for movement along a row of plants and having means for removing crops from the plants, a conveyor system comprising:
   a. means on said frame defining a conveyor path having a portion adjacent said crop removing means and a portion spaced from said crop removing means;
   b. a plurality of buckets for receiving and carrying removed crops;
   c. supporting means operatively associated with each of said buckets and engaging said path defining means for movement along said conveyor path, said supporting means allowing pivotal movement of said buckets, each of said supporting means comprising shaft means at each end of said bucket and pivotally connected to said bucket, bearing means operatively connected on said shaft means for engaging said path defining means, and means extending from said shaft means for engaging said bucket at a location spaced from the pivotal connection of at least one of said shaft means to said bucket for limiting pivotal movement of said bucket along the portion of said conveyor path adjacent said crop removing means;
   d. means for moving said buckets along said conveyor path; and
   e. pivoting means on said buckets for engaging cooperating means on said frame during a portion of the movement of said buckets along said conveyor path, said path defining means engaging said pivoting means along said conveyor path portion spaced from said crop removing means, whereby said buckets are in a position carrying crops along the portion of said path adjacent said crop removing means and said buckets are pivoted to a position discharging crops along the portion of said path spaced from said crop removing means.

2. A conveyor system as defined to claim 1, wherein said bucket moving means comprises a roller chain, said bearing means comprises a roller in said chain, and said means for limiting pivotal movement is connected to another roller in said chain so as to be held in a fixed position relative to said bucket along the portion of said conveyor path adjacent said crop removing means.

3. A conveyor system as defined in claim 1, wherein said buckets are of relatively rigid nonporous material.

4. A conveyor system as defined in claim 1, wherein said pivoting means comprises an element fixed on an end of said bucket and extending outwardly therefrom.

5. A conveyor system as defined in claim 1, wherein said conveyor path portions adjacent and spaced from said crop removing means comprise lower and upper horizontal path portions, respectively relative to said frame and wherein path defining means includes spaced apart portions connecting said upper and lower portions.

6. A conveyor system as defined in claim 1, wherein said frame has a configuration enabling said machine to straddle a row of plants and further including means on said frame defining a second similar conveyor path whereby said conveyor paths are located on opposite sides of the row of plants.

7. A conveyor system as defined in claim 1, wherein said path defining means comprises spaced apart parallel rails positioned on said frame to provide upper and lower horizontal conveyor path portions connected together by spaced apart portions.

8. A conveyor system comprising;
   a. a frame;
   b. means on said frame defining a conveyor path having a product receiving station and a product discharging station spaced along said path from said receiving station;
   c. a plurality of buckets for receiving and carrying products;
   d. supporting means operatively associated with each of said buckets and engaging said path defining means for movement along said conveyor path, said supporting means allowing pivotal movement of said buckets, each of said supporting means comprising shaft means at each end of said bucket and pivotally connected to said bucket, bearing means operatively connected on said shaft means for engaging said path defining means, and means extending from said shaft means for engaging said bucket at a location spaced from the pivotal connection of at least one of said shaft means to said bucket for limiting pivotal movement of said bucket along the portion of said conveyor path including said receiving station and prior to said discharging station;
   e. means for moving said buckets along said conveyor path; and
   f. pivoting means on said buckets for engaging cooperating means on said frame during a portion of the movement of said buckets along said conveyor path, said path defining means engaging said pivoting means along a portion of said conveyor path including said discharging station, whereby said buckets are in a position carrying crops along the portion of said path including said receiving station and said buckets are pivoted to a position discharging crops along the portion of said path including said discharging station.

9. A conveyor system as defined in claim 8, wherein said means for limiting pivotal movement comprises an element having a first portion extending from said shaft means along said bucket, a second portion extending from said first portion and engaging said bucket at said spaced location, and means for holding said second portion in a fixed position relative to said bucket along the portion of said conveyor path adjacent said crop removing means.

10. A conveyor system as defined in claim 8, wherein said supporting means comprises an element at each end of said bucket, each element having a shaft portion pivotally connected to said bucket and extending outwardly therefrom, said bearing means being connected on said shaft portion outwardly of said bucket, and each element having a first leg portion extending from said shaft portion and a second leg portion extending from said first leg portion, said second leg portion engaging said bucket at said spaced location, and said second leg portion engaging a part of said conveyor system in a manner whereby said second leg portion is held in a fixed position relative to said bucket along the portion of said conveyor path adjacent said crop removing means.

11. A conveyor system as defined in claim 8, wherein said bucket moving means comprises a roller chain, said bearing means comprises a roller in said chain, and said means for limiting pivotal movement is connected to another roller in said chain so as to be held in a fixed position relative to said bucket along the portion of said conveyor path adjacent said crop removing means.

12. A conveyor system as defined in claim 11, wherein said means for limiting pivotal movement comprises an element having a first portion extending from said shaft means along said bucket and a second portion extending from said first portion and engaging said bucket at said spaced location, said second portion being connected to said other roller in said chain.

13. In a harvesting machine including an ambulatory supporting frame adapted for movement along a row of plants and having means for removing crops from the plants, a conveyor system comprising:
   a. means on said frame defining a conveyor path having a portion adjacent said crop removing means and a portion spaced from said crop removing means;
   a plurality of buckets for receiving and carrying removed crops;
   c. supporting means operatively associated with each of said buckets and engaging said path defining means for movement along said conveyor path, said supporting means allowing pivotal movement of said buckets, each of said supporting means comprising shaft means at each end of said bucket and pivotally connected to said bucket, bearing means operatively connected on said shaft means for engaging said path defining means, and means for engaging said bucket at a location spaced from the pivotal connection of at least one of said shaft means to said bucket for limiting pivotal movement of said bucket along the portion of said conveyor path adjacent said crop removing means, said means for limiting pivotal movement comprising an element having a first portion extending from said shaft means along said bucket, a second portion extending from said first portion and engaging said bucket at said spaced location, and means for holding said second portion in a fixed position relative to said bucket along the portion of said conveyor path adjacent said crop removing means;
   d. means for moving said buckets along said conveyor path; and
   e. pivoting means on said buckets for engaging cooperating means on said frame during a portion of the movement of said buckets along said conveyor path, said path defining means engaging said pivoting means along said conveyor path portion spaced from said crop removing means, whereby said buckets are in a position carrying crops along the portion of said path adjacent said crop removing means and said buckets are pivoted to a position discharging crops along the portion of said path spaced from said crop removing means.

14. In a harvesting machine including an ambulatory supporting frame adapted for movement along a row of plants and having means for removing crops from the plants, a conveyor system comprising:
   a. means on said frame defining a conveyor path having a portion adjacent said crop removing means and a portion spaced from said crop removing means;
   b. a plurality of buckets for receiving and carrying removed crops;
   c. supporting means operatively associated with each of said buckets and engaging said path defining means for movement along said conveyor path, said supporting means allowing pivotal movement of said buckets, each of said supporting means comprising shaft means at each end of said bucket and pivotally connected to said bucket, bearing means operatively connected on said shaft means for engaging said path defining means, and means for engaging said bucket at a location spaced from the pivotal connection of at least one of said shaft means to said bucket for limiting pivotal movement of said bucket along the portion of said conveyor path adjacent said crop removing means, said supporting means comprising an element at each end of said bucket, each element having a shaft portion pivotally connected to said bucket and extending outwardly therefrom, said bearing means being connected on said shaft portion outwardly of said bucket, and each element having a first leg portion extending from said shaft portion and a second leg portion extending from said first leg portion, said second leg portion engaging said bucket at said spaced location, and said second leg portion engaging a part of said conveyor system in a manner whereby said second leg portion in held in a fixed position relative to said bucket along the portion of said conveyor path adjacent said crop removing means;
   d. means for moving said buckets along said conveyor path; and
   e. pivoting means on said buckets for engaging cooperating means on said frame during a portion of the movement of said buckets along said conveyor path, said path defining means engaging said pivoting means along said conveyor path portion spaced from said crop removing means, whereby said buckets are in a position carrying crops along the portion of said path adjacent said crop removing means and said buckets are pivoted to a position discharging crops along the portion of said path spaced from said crop removing means.

15. In a harvesting machine including an ambulatory supporting frame adapted for movement along a row of plants and having means for removing crops from the plants, a conveyor system comprising:
   a. means on said frame defining a conveyor path having a portion adjacent said crop removing means and a portion spaced from said crop removing means;
   b. a plurality of buckets for receiving and carrying removed crops;
   c. supporting means operatively associated with each of said buckets and engaging said path defining means for movement along said conveyor path, said supporting means allowing pivotal movement of said buckets, each of said supporting means comprising shaft means at each end of said bucket and pivotally connected to said bucket, bearing means operatively connected on said shaft means for engaging said path defining means, and means for engaging said bucket at a location spaced from the pivotal connection of at least one of said shaft means to said bucket for limiting pivotal movement of said bucket along the portion of said conveyor path adjacent said crop removing means, said means for limiting pivotal movement comprising an element having a first portion extending from said shaft means along said bucket and a second portion extending from said first portion and engaging said bucket at said spaced location;
   d. means for moving said buckets along said conveyor path, said bucket moving means comprising a roller chain, said bearing means comprising a roller in said chain, said second portion of said means for limiting pivotal movement being connected to another roller in said chain so as to be held in a fixed position relative to said bucket along the portion of said conveyor path adjacent said crop removing means; and
   e. pivoting means on said buckets for engaging cooperating means on said frame during a portion of the movement of said buckets along said conveyor path, said path defining means engaging said pivoting means along said conveyor path portion spaced from said crop removing means, whereby said buckets are in a position carrying crops along the portion of said path adjacent said crop removing means and said buckets are pivoted to a position discharging crops along the portion of said path spaced from said crop removing means.

\* \* \* \* \*